June 30, 1959 R. P. B. YANDELL 2,892,997
DIGITAL COMPUTING MACHINES
Filed Sept. 24, 1956 8 Sheets-Sheet 1

Inventor
RONALD P. B. YANDELL
By [signature]
Attorneys

June 30, 1959 R. P. B. YANDELL 2,892,997

DIGITAL COMPUTING MACHINES

Filed Sept. 24, 1956 8 Sheets-Sheet 2

Inventor
RONALD P. B. YANDELL
By
Attorneys

June 30, 1959 R. P. B. YANDELL 2,892,997

DIGITAL COMPUTING MACHINES

Filed Sept. 24, 1956 8 Sheets-Sheet 3

Inventor
RONALD P. B. YANDELL
By
[signature]

Inventor
RONALD P. B. YANDELL
By [signature]

June 30, 1959 R. P. B. YANDELL 2,892,997

DIGITAL COMPUTING MACHINES

Filed Sept. 24, 1956 8 Sheets-Sheet 5

Inventor
RONALD P. B. YANDELL
By [signature]

Inventor
RONALD P.B. YANDELL
By [signature]
Attorneys

June 30, 1959 R. P. B. YANDELL 2,892,997

DIGITAL COMPUTING MACHINES

Filed Sept. 24, 1956 8 Sheets-Sheet 7

Inventor
RONALD P.B. YANDELL
By [signature]

Inventor
RONALD P. B. YANDELL
By [signature]
Attorney

United States Patent Office 2,892,997

Patented June 30, 1959

2,892,997

DIGITAL COMPUTING MACHINES

Ronald Percy Bawden Yandell, Streatham, London, England, assignor to Powers-Samas Accounting Machines Limited, London, England, a British company Application September 24, 1956, Serial No. 611,668

Claims priority, application Great Britain October 24, 1955

27 Claims. (Cl. 340—174)

Figure 1:
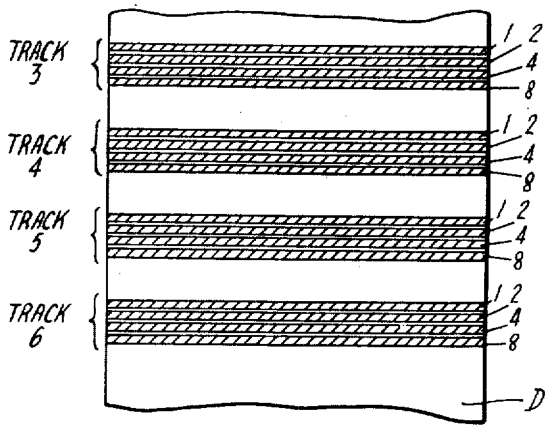

This invention relates to digital computing machines and in particular to an electronic programme controlled digital computer.

As is well understood, the programme which controls a calculation carried out by a programme-controlled digital computor consists of a series of instructions which it is usual to enter into the machine in coded form. These instructions act normally in a predetermined order to condition the machine to perform a series of operations which comprise the calculation, but the order may be modified under control of the programme during the course of the calculation. The numerical data upon which the operations are carried out is sensed, by a sensing device embodied in the machine, from a record such as a statistical record card or tape and is stored within the machine in a manner such that when a number is required during a calculation it can be selected from the store by the currently acting programme instruction and then acted upon as required by that instruction, the number resulting from the operation being entered into storage. The location of a number within the store, or the location of the store into which a number is to be entered, is usually indicated by a coded number referred to as the address of the location. The inclusion of addresses in an instruction to perform an arithmetical operation, such as addition or multiplication by 10, allows the numbers in certain of the addressed locations to be transmitted to an arithmetic unit which, under control of the instruction, effects the desired operation upon the numbers and transmits any number resulting from the operation to a predetermined one of the addressed storage locations so that it may be used in following operations, or from which it can be read and transmitted to a recording unit which may consist of a punch unit to punch the number in a record such as a statistical record card. Alternatively, the instruction may be to perform an operation affecting the control of the machine, for example the instruction may be to omit a succeeding group of instructions in which event the storage location is so addressed that the number stored thereat indicates the number of succeeding instructions which are to be omitted.

It often occurs in programming that a given sequence of operations is required to be repeated with different sets of stored numbers. This does not usually require the sequence of instructions to be entered into the machine more than once but is usually carried out by obeying the instructions in their normal sequence and then including an instruction to transfer the control of the machine back to the first instruction of the sequence following which the sequence of instructions is again obeyed. Such repetition may take place several times and there must be included an instruction to terminate the repetition and cause the control to proceed to the next instruction to follow the repeated sequence of instructions. If each repetition of a sequence of operations is to be carried out on numbers from a different set of storage locations either the locations addressed must be changed for each repetition, a process known as modification of addresses, or the sequence of operations is repeated on the numbers in the same set of storage locations, but before each repetition a new set of numbers is transmitted to these storage locations. As will hereinafter appear, the present invention is concerned with the said process known as modification of addresses.

It is usual to store coded numbers representing the instructions and addresses in the same way as numerical data is stored. In this way coded numbers which are storage location addresses can be passed to the arithmetic unit. For address modification the coded numbers which are the addresses to be modified are passed to the arithmetic unit to have an appropriate amount added thereto or subtracted therefrom to give the new number which is the modified address and which is transmitted to the storage locations for programme instructions. This method of address modification requires storage to be provided for the instructions, thus greatly increasing the storage necessary in the machine above that required for data storage, and involves changing the coded addresses from their original values to new values. Each address to be changed generally requires a separate modify address instruction and the modified address usually replaces the previous address at a storage location containing the instruction thus necessitating a further modify address instruction when reversion to the original instruction is required. As an alternative, however, the modified addresses may be stored in locations different from those in which the original instructions are stored but this arrangement increases the number of storage locations required for instructions and is unsuitable for the modification of addresses in a static programme.

It is a main object of the present invention to provide means such that a storage location can be addressed by a coded address number in an instruction and by co-operation with address-modifying means will permit information to be entered into or read from a storage location other than that stated in an instruction and displaced from that stated by the instruction as determined by the address-modifying means thereby permitting the original address indicated by the instruction to remain unchanged.

A further object of the invention is to provide means whereby all addresses for all operations following a single modify address instruction are modified by the amount indicated in that instruction and remain so modified until a further modify address instruction changes that amount or a demodify address instruction renders the address-modifying means inactive until another modify address instruction becomes effective.

A still further object of the invention is to provide means whereby addresses modified in accordance with either of the previously stated objects may all be demodified by a single demodify address instruction, after which no addresses are modified until receipt of a further modify address instruction.

According to the present invention there is provided a digital computing machine comprising data storage means by which data can be stored in storage locations arranged to be electrically addressed, control gates to control access to the storage locations, control gate addressing means operable to control said control gates, and a counter co-operating with the control gates to determine the relationship between the storage location to which access is permitted and that indicated by the control gate addressing means.

Figure 2:
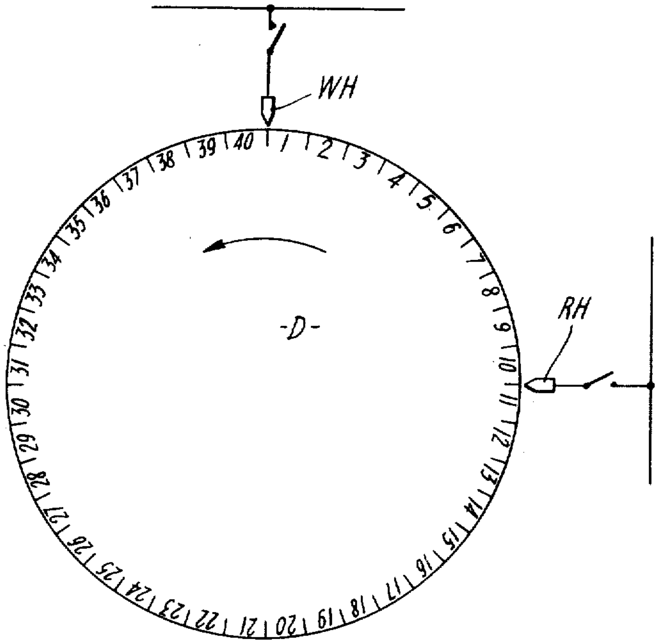
Figure 3:
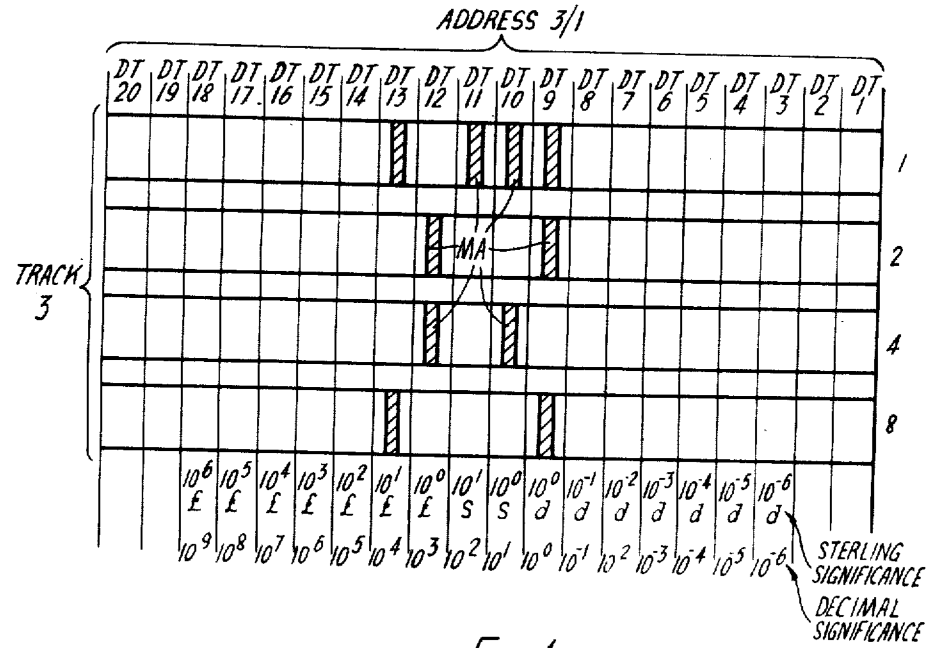
Figure 4:
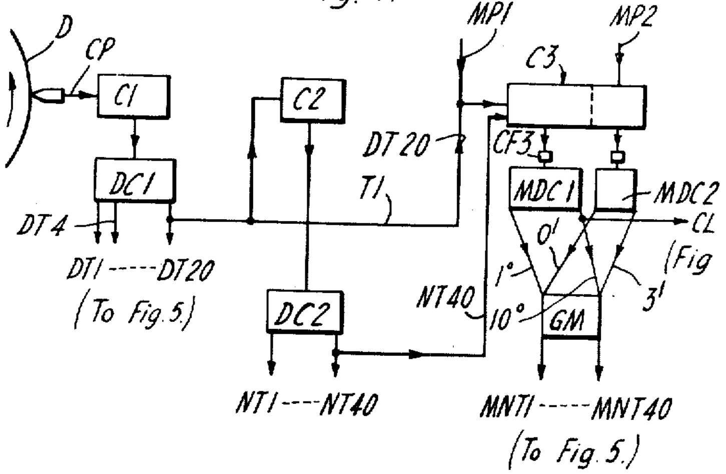
Figure 5:
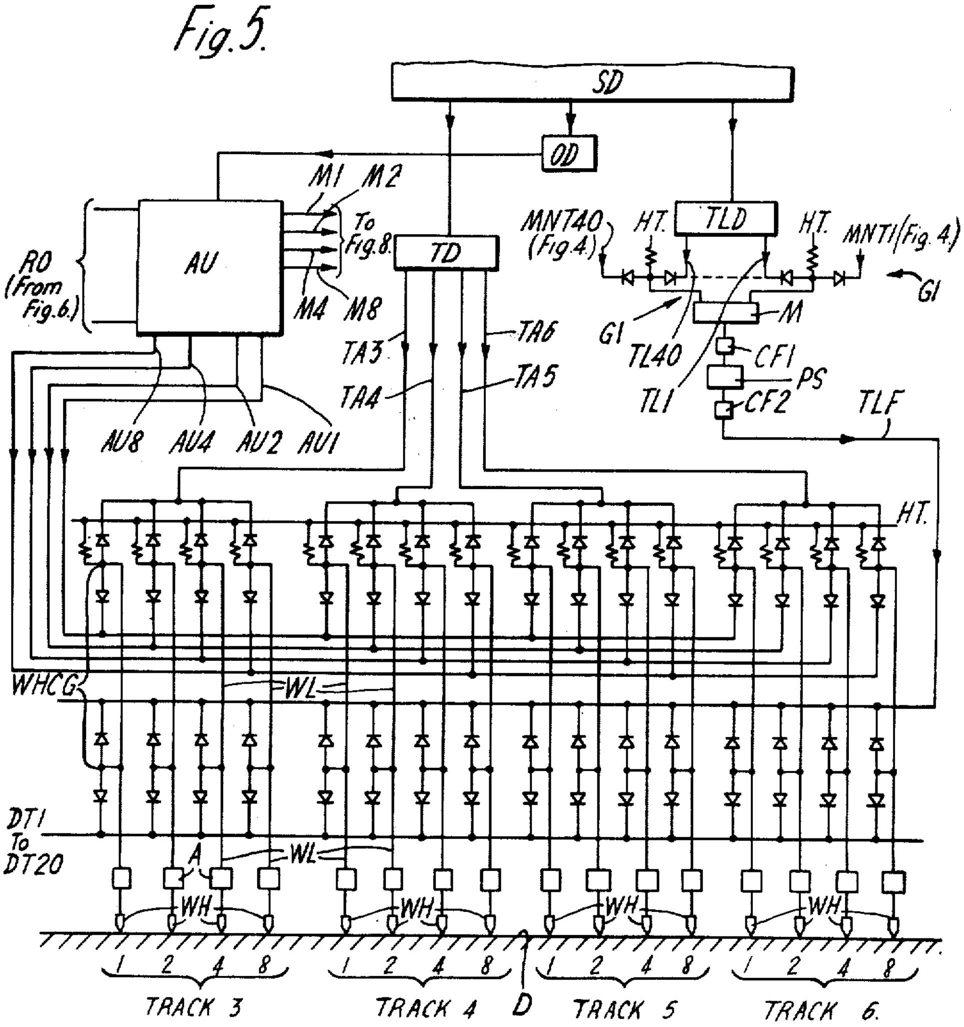
Figure 6:
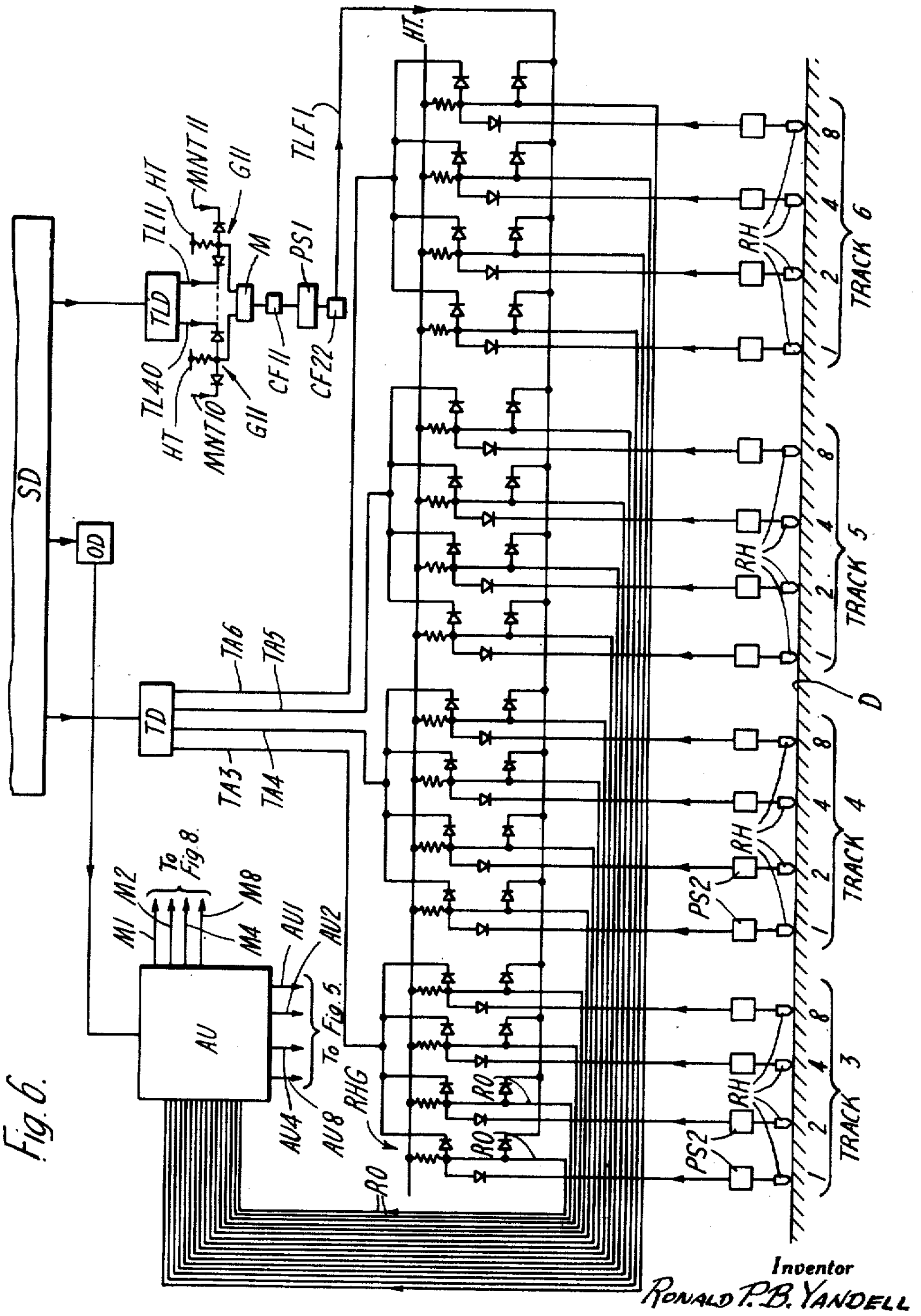
Figure 7:
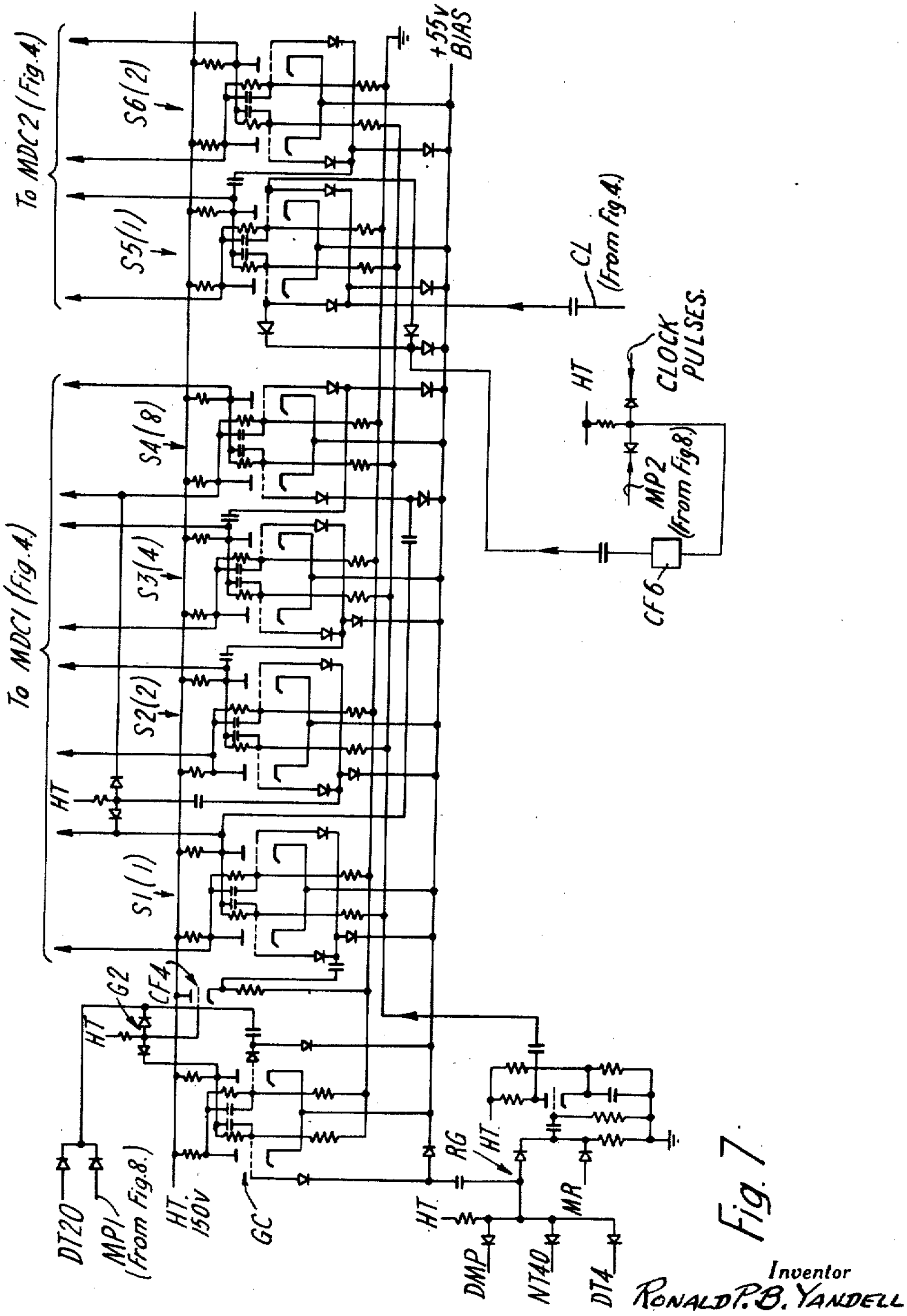
Figure 8:
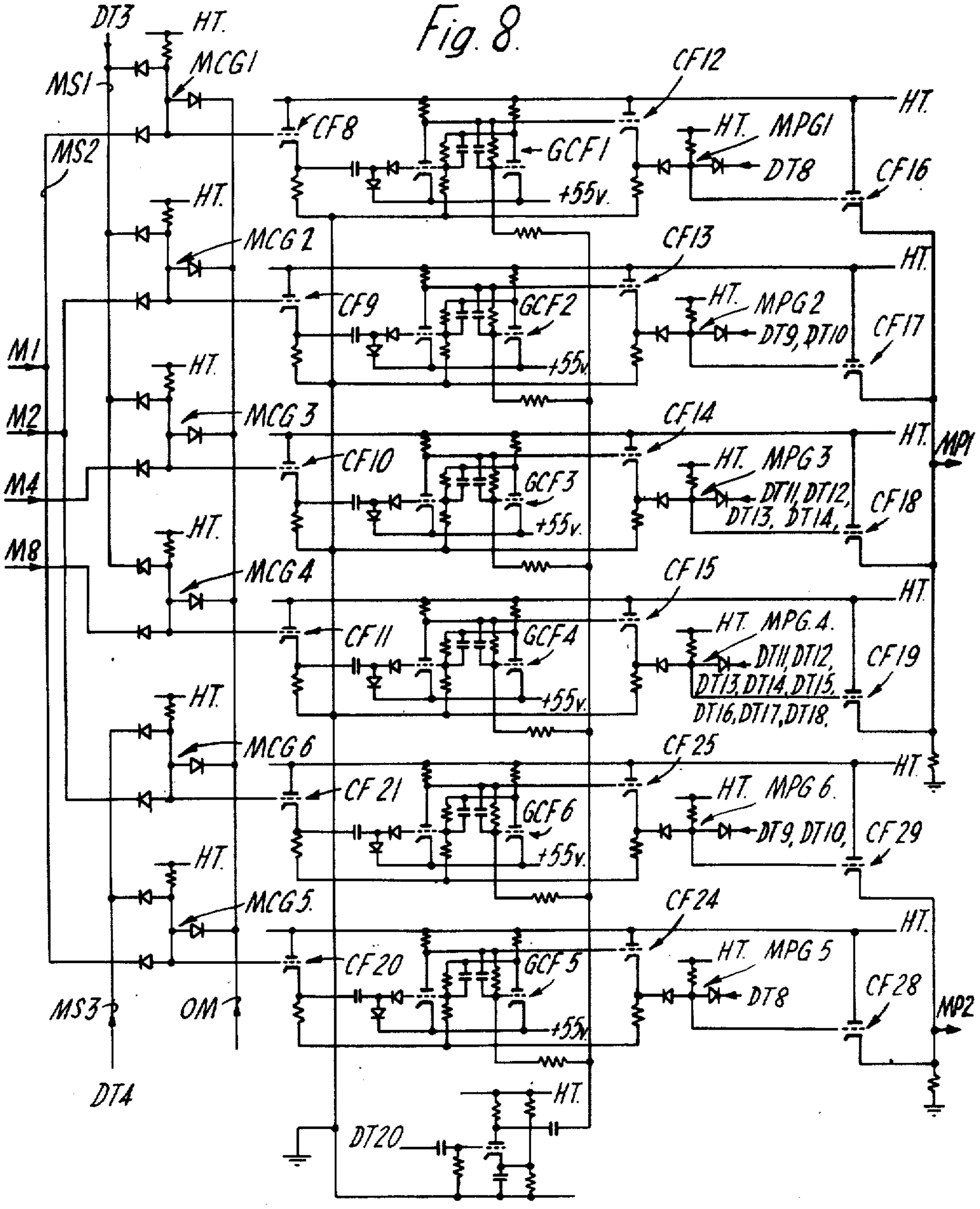
Figure 9:
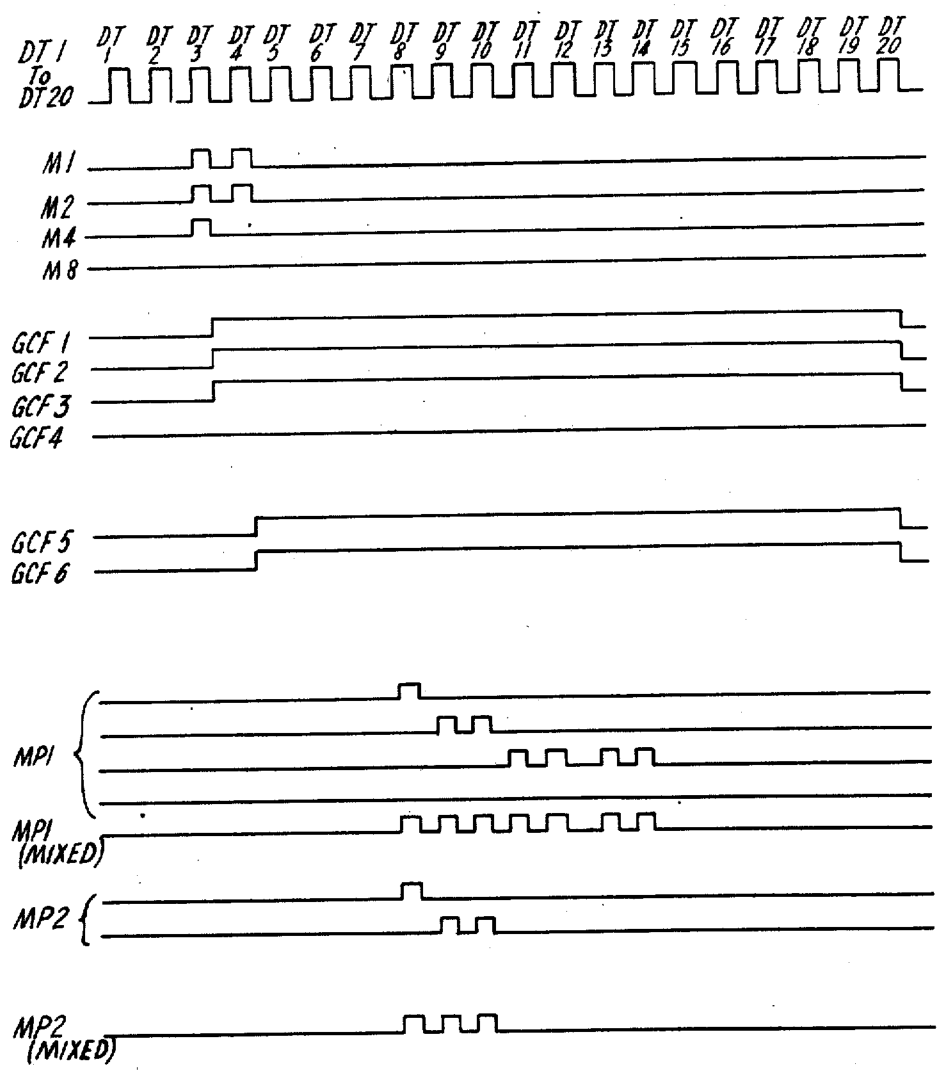
Figure 10:
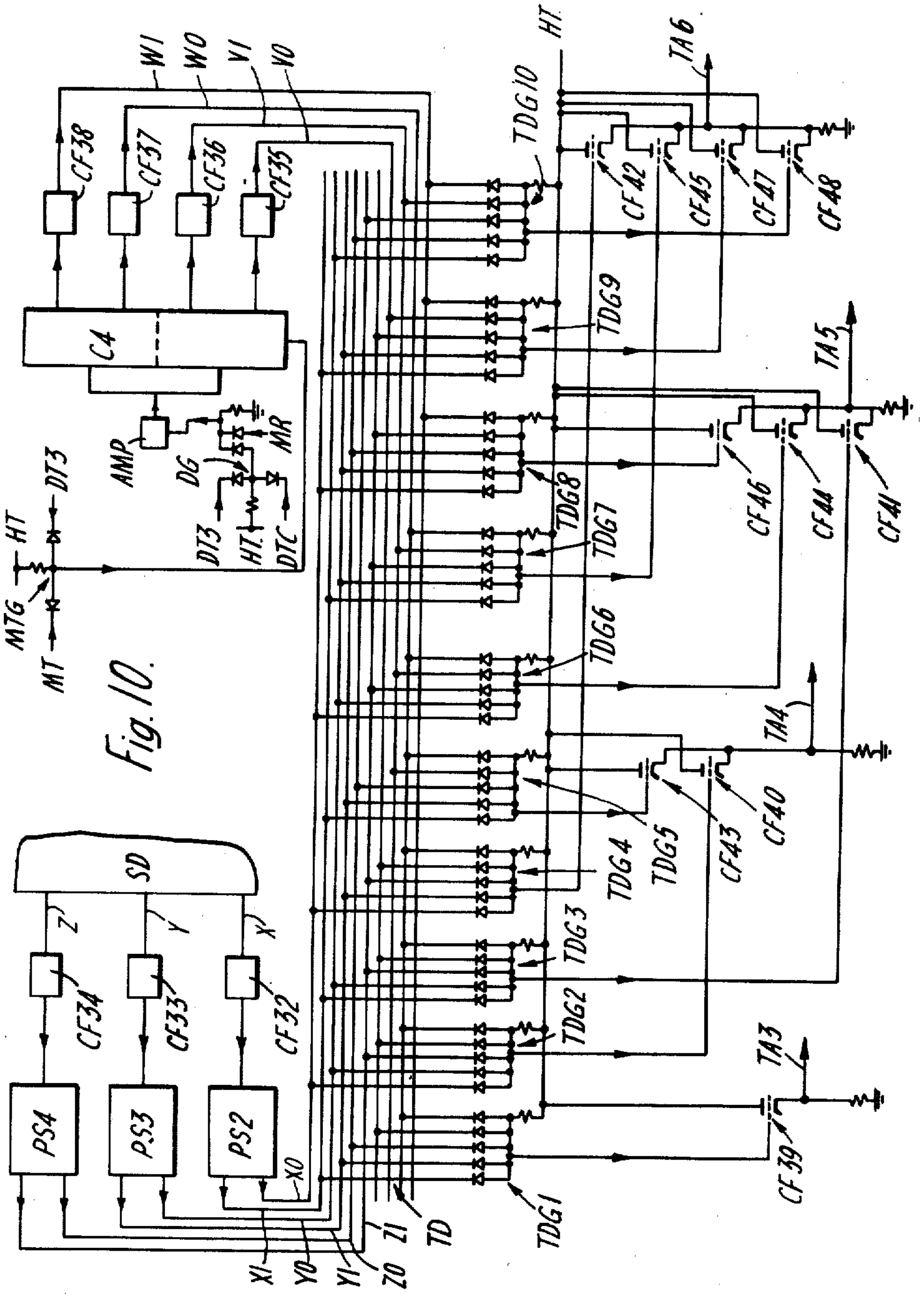

In order that the invention may be clearly understood one embodiment thereof will now be described, by way of example, with reference to the accompanying diagrammatic drawings, in which:

Fig. 1 is an elevation of a portion of a magnetic data-storage drum,

Fig. 2 illustrates the arrangement of data-receiving sections for a track extending round the drum at right-angles to the axis of rotation thereof, Fig. 3 illustrates the manner of recording data on a data-receiving section of the drum, Fig. 4 is a block diagram illustrating the manner in which pulses are derived to control writing and reading, Fig. 5 is a circuit diagram illustrating the manner of addressing the write heads for the drum, Fig. 6 is a circuit diagram illustrating the manner of addressing the read heads for the drum, Fig. 7 is a circuit diagram illustrating a scale-of-forty counter and the method by which the count from the counter is modified to bring it out-of-step with the drum, Fig. 8 is a circuit diagram illustrating the manner in which pulses are generated for passage to the scale-of-forty counter to effect modification thereof, Fig. 9 is a wave-form diagram illustrating the timing of thirty-seven modifying pulses to the scale-of-forty counter, and Fig. 10 is a diagram illustrating a mode of modifying a track address.

In the following description there is, for convenience, described the application of the invention to a data storage system according to which data is, in known manner, stored on a drum D, Figs. 1, 2, 4, 5 and 6, having a magnetizable peripheral surface and arranged for continuous rotation about its longitudinal axis. It is to be understood, however, that other storage systems may be used, for example, a system employing delay lines, or a register consisting of Eccles-Jordon trigger circuits known as flip-flops.

Referring to Figs. 1 to 3, data is stored on a plurality of predetermined areas of the drum D, hereinafter referred to as tracks, extending circumferentially round the drum at right-angles to the axis of rotation thereof and being spaced apart axially of the drum. Fig. 1 illustrates four of said plurality of tracks the four tracks being, for convenience, referred to respectively as track 3, track 4, track 5, and track 6. Each of these tracks consists of four bands to which, as indicated in Figs. 1 and 3, there is allocated respectively the significance 1, 2, 4, 8 to permit the recording to digits on the track according to the 1, 2, 4, 8 code.

Each track, as indicated in Fig. 2, is, to suit the electronic timing, assumed to be divided into forty track locations which, as indicated in Fig. 2, pass continuously in succession under data-recounting means shown as a write head WH and a read head RH. Thus the tracks can be addressed together with a particular track location, for example 4/15 indicates track 4 and track location 15.

The manner in which a number is stored is illustrated in Fig. 3 which, for the purpose of description, is assumed to represent address 3/1. From Fig. 3 it will be seen that address 3/1 is assumed to be sub-divided into twenty portions, each of which passes beneath a write head WH and a read head RH for a period of time during which a pulse DT1 to DT20, as appropriate, permits a figure coded according to the 1, 2, 4, 8 code to be written on or read from this portion of a location passing its write head WH or its read head RH. The time taken for a location to pass its write head WH or its read head RH is a number time NT which consists of twenty digit times DT1 to DT20. The arrangement is such that only during the application of digit times pulses DT3 to DT18 inclusive are numbers written on to or read from the drum, the digit times pulses DT1, DT2, DT19 and DT20 being reserved for other purposes unconnected with the present invention. According as to whether an address is to accommodate a Sterling or a decimal number the numbers written or read during the application of digit times pulses DT3 to DT18 have, in terms of powers of ten, the significance illustrated at the bottom of Fig. 3. The magnetized areas MA, Fig. 3, illustrate the manner in which the number £96.15s.11d. is written on drum D, and the arrangement is such that if a number is to be written at an address where a number is already stored the new number supersedes that already stored.

From the foregoing it will be understood that for each track there must be provided, during each rotation of the drum D, a succession of 800 pulses to ensure that writing or reading can, as required, be effected in each of the 800 number receiving areas provided round the track. To this end the digit times pulses DT are derived from a digit times scale-of-twenty counter C1, Fig. 4, of any suitable known form. Selection of a track location in tracks 3, 4, 5 and 6 in which writing or reading is to be effected is obtained, as described below, partly under control of modifying number times pulses MNT1 or MNT40 and selection of locations in other tracks, with which the present invention is not concerned, is partly under control of number times pulses NT1 to NT40. The pulses DT, NT and MNT are derived respectively from centers C1, C2 and C3, which are synchronised with the drum D by being triggered with pulses CP, herein referred to as clock pulses derived from and permanently recorded on the drum D, and the counters C2 and C3, referred to respectively as a number times counter and an address modifying counter, are each scale-of-forty counters the outputs from which are according to a predetermined code. The outputs from counters C2 and C3 are fed respectively to a decoder DC2 and to a decoder MDC1 and MDC2, the decoder MDC1 and MDC2 being referred to in greater detail below. When the machine is in operation the pulses derived from the number times counter C2 go up in potential as a corresponding location of a track passes a write head or a read head associated therewith. Likewise, the pulses derived from the address modifying counter C3 when modification is not being effected also go up in potential as the corresponding location of a track passes a write or a read head associated therewith. The counters C2 and C3 are triggered, as each track location commences to pass a write or a read head, by the back edge of each digit times pulse DT20, the triggering pulse passing to counters C2, C3 along line T1, Fig. 4, common thereto.

The instructions may be presented by any of the methods employed in programme controlled electrical computing machines but in which there is provision for transfer of the control of the machine from the transfer instruction to an earlier instruction. Such means form no part of the present invention and are not described herein. The machine, however, uses a "two address system" according to which up to two addresses are named in any instruction. For example, if the instruction is:

ADD ADDRESS A ADDRESS B the arithmetic unit AU, Fig. 5, being instructed to add, will add an amount read from address A to an amount read from address B and the result will be written in address A. When, however, a number of like operations is to be carried out successively on numbers in different locations, the facility for controlling the transfer of instructions permits such operations without the necessity of repeating the instructions as the machine will keep switching from the end back to the beginning of the group of operations. The advantage of this facility can, however, be more fully utilised by effecting modification of the addresses so that each of the said groups of operations is effected on numbers read from different locations and such modifications is effected by arranging that the MNT pulses are out-of-step with the drum D as will be described below.

Before describing the mode of modifying addresses, it will be convenient to describe the normal mode of operation when the MNT pulses are in step with the drum D.

Referring to Fig. 5, instructions are sensed from a programme card by a sensing device SD and the instruction is decoded in an instruction decoder OD and is transmitted to the arithmetic unit AU, and if necessary to other parts of the machine, to condition it to perform the desired function and transmit data representing pulses serially along lines AU1, AU2, AU4, and AU8 respectively representative, according to the 1, 2, 4, 8 code of the digits to be written on drum D.

The track address is sensed from the instruction card and is decoded by a track decoder TD which transmits a signal TA3, TA4, TA5, TA6, as appropriate to each of the four write head control gates WHCG for the track to be addressed.

The track location address is also sensed from the instruction card by the sensing device SD and is decoded by a track location decoder TLD so that the outputs therefrom are applied along lines TL1 to TL40 to the appropriate ones of forty gates G1 to which the modify number times pulses MNT1 to MNT40, as appropriate, are also applied. The gated outputs from gates G1 are passed to a mixer M, through cathode follower CF1, a pulse shaper PS, and cathode follower CF2 to line TLF by which they are applied to all control gates WHCG. The digit times pulses DT1 to DT20 are also applied to all control gates WHCG.

As an example of the mode of operation of the addressing apparatus let it be assumed that, as shown in Fig. 3, the amount of eleven pence is to be written in address *3/1*. Thus, while digit times pulse DT9 is applied to all control gates WHCG, data respresenting pulses on lines AU1, AU2 and AU8 will also be applied to the gates; a pulse from TD along line TA3 will also be applied to the control gates WHCG for track 3, and as pulses TL1 and MNT1 are applied to gate G1 a pulse passes from that gate along line TLF to the gates WHCG. Thus at this time the control gates WHCG for write heads 1, 2, and 8 of track 3 are all up in potential and pulses pass from the output points of the control gates along write lines WL to the write heads 1, 2 and 8 so that eleven is written in address *3/1* during digit time 9. The modify number times pulse is applied to the control gate substantially for the whole of the period during which track location 1 is passing the write head, being triggered "on" by the back edge of the last digit times pulse DT20 of the preceding group of digit times pulses.

The arithmetic unit may be arranged in any suitable manner to apply data representing pulses as required, for example it may be arranged to apply the number pulses in each number time. The number, however, cannot be written until the appropriate MNT pulse is applied to gates WHCG and as soon as the number is written the machine is switched to the next instruction of the programme unit and this, in general, will effect an alteration of address.

The read heads RH are addressed in a manner somewhat similar to that described above with reference to the addressing of the write heads WH in that the track addressed is under control of the track decoder TD, Fig. 6, and the track location addressed is under control of a track location decoder the signals from which are applied to gates G11. In this instance, however, it is to be understood that as the read heads RH are displaced by 90° relative to the write heads, as illustrated in Fig. 2, when the track location 1 is passing the write head WH, the track location 11 is passing the read head RH. Accordingly the arrangement is such that, for the read head, the MNT1 pulses are gated with decoded track location pulses TL11, MNT2 pulses with track location pulses TL12, MNT30 pulses with track location pulses TL40, and MNT40 pulses with track location pulses TL10. The pulses passing gates G11 are mixed in a mixer M, are passed to a cathode follower CF11, pulse shaper PS1, and a second cathode follower CF22 and thence by line TLF1 are applied simultaneously to a plurality of read head control gates RHG. The pulses from the track decoder are also applied to the control gates RHG so that when a gate is conditioned by a pulse along line TLF1 and from the track decoder, and the read head RH associated with the gates reads a magnetised area MA, Fig. 3, all of the pulses applied to that control gate are up in potential and a pulse passes through the gate along the output line RG therefrom to the arithmetic unit AU. The pulse initiated by a magnetised area MA passing a read head RH is reshaped by a pulse shaper PS2 before passing to its control gate RHG.

From the foregoing it will be understood that the control gates WHCG or RHG, as appropriate, are normally arranged to give access sequentially to the track locations appropriated thereto.

In order to bring the MNT pulses out of step with the drum D for the purpose of modifying the track location address and thereby causing the control gates to give access to their track locations out of the normal sequence thereof, one or more additional or modifying pulses are entered into the address modifying counter C3 as the result of an instruction to modify. Thus if while track location 7 is passing a write head one extra pulse is added to counter C3 the counter, which prior to receiving the additional pulse was in step with the drum and transmitted pulse MNT7, is caused to change to MNT8 and from this point on the pulses transmitted by the address modifying counter C3 will be one step ahead of the drum D and will continue so until a demodify order returns the counter into step with the drum, or until a further modify order changes the out-of-step relation of the MNT pulses with the drum. While the MNT pulses are one step ahead of the drum the decoding of a track location by decoder TLD will result in writing, or reading, of the track location which is numbered one less than that of the MNT pulse, for example, address 3/4 on the programme card would cause a pulse on line TL4 allowing the MNT4 pulse through gate G1 at which these coincide but this pulse, being one number time ahead of the drum, occurs as location 3/3 passes under the write heads, so that although the card addresses track location 3/4 it is location 3/3 in which writing is effected because the gate normally controlled by pulses TL4 and MNT4 will be opened one number time earlier, that is while track location 3 is passing under write head WH.

Should it be required to write in a track location one ahead of that indicated by the programme card it is necessary to add 39 pulses into the counter C3. For example, if counter C3 stands at MNT5 and 39 is added thereto, then a pulse MNT4 will be applied to the gate G1 controlled by TL4 but at this time track location 5 will be passing write head WH so that if at some subsequent time say track location 10 is addressed by the programme card then writing will be effected in track location 11.

To demodify the counter C3 it is reset to the MNT1 condition thereof, as described below, at the end of the next NT40 pulse from the number times counter C2, that is as track location 1 is about to pass under the write head WH.

The address modifying counter C3 is illustrated in Fig. 7 and consists of a scale-of-ten counter and a scale-of-four counter each of which may be of any suitable kind but which, for purposes of illustration, consist respectively of four flip-flop tubes S1(1), S2(2), S3(4) and S4(8) and two flip-flop tubes S5(1) and S6(2) operable, in known manner, respectively to count digits $10^0$ and digits $10^1$. During operation of counter C3 when the MNT pulses are in step with the drum, the counter is triggered by each DT20 pulse from the digit times counter C1, the DT20 pulses being applied to a gate G2 which is conditioned by a gate control Flip-flop tube GC. The DT20 pulses passing through gate G2 are added into the scale-of-ten counter and the anode potentials of this counter are taken through cathode followers CF3, Fig. 4, to the decoder MDC1 which, in any suitable known manner, decodes the coded digits from the counter into pulses representative of counter of 0, 1, 2 . . . 9, these pulses being numbered 1 to 10 respectively since they correspond with the passage under the write heads of locations 1 to 10 when the $10^1$ counter stands at 0, locations 11 to 20 when the $10^1$ counter is at 1, locations 21 to 30 when the $10^1$ counter is at 3. Should the scale-of-ten counter exceed a count of 9, the output numbered 10 from the decoder MDC1 is energised, and the potential of the line CL, Figs. 4 and 7, is raised. The back edge of the tenth DT20 pulse applied to the gate G2 returns the scale-of-ten counter to the condition thereof which is decoded to give the output numbered 1 from MDC1. When the output numbered 10 from the decoder MDC1 is de-energised, the potential of the line CL falls, and the scale-of-four counter is triggered to effect a carry from the scale-of-ten counter.

When a modify address instruction is given the appropriate number of pulses is entered into address modifying counter C3 to cause the MNT pulses to be brought out-of-step with drum D. The modify pulses MP1, Fig. 8, for the scale-of-ten counter are applied to gate G2 during digit times DT8 to DT18 and the modify pulses MP2, also during digit times DT8 to DT18, are gated with clock pulses and applied to a cathode follower CF6, Fig. 7, to effect triggering of the scale-of-four counter. Thus if, for example, the instruction is to modify by 37, seven modify pulses MP1 will be entered through gate G2 into the scale-of-ten counter and three modify pulses MP2 will be entered through cathode follower CF6 to the scale-of-four counter. If during this time the scale-of-ten counter should pass from the condition decoded as 10 to the condition decoded as 1, a carry should be counted into the scale-of-four counter but this might occur simultaneously with a modify pulse MP2 and so get lost. To avoid this possibility the modify pulses MP2 are gated with clock pulses as described above, and the timing is such that the negative edge of a clock pulse occurs earlier in a digit time than the negative edge of the pulse on the line CL. Thus a carry from the scale-of-ten counter cannot coincide with a gated modify pulse.

The counter C3 is reset at the start of every calculation by a master reset pulse applied at MR, Fig. 7, the pulse being produced as drum track locations 1 are about to pass under the write heads WH. On resetting of the counter the left-hand anodes, as viewed in Fig. 7, of all flip-flops S1, S2, S3, S4, S5 and S6 are up in potential thus resulting in the decoded output MNT1 being up in potential.

The counter C3 is also reset to the state giving MNT1 up in potential by an instruction to demodify which results in the application of a pulse DMP, Fig. 7, to a reset gate RG. When pulse DMP is applied to gate RG the potential at the DMP side of the gate goes up and remains up until the end of the period NT40, derived from counter C2, which is always in step with the drum D. The pulse NT40 is applied to gate RG and the counter C3 is reset by the DT4 pulse which occurs while pulse NT40 is applied to gate RG. The DT4 pulse from gate RG also triggers the gate control flip-flop GC so that, as viewed in Fig. 7, the right-hand anode thereof goes down in potential thus closing gate G2 to the DT20 pulse which occurs at the end of NT40 and which would otherwise trigger the counter C3 prematurely to the "2" state thereof. The back edge of the DT20 pulse occurring at the end of NT40 triggers the gate control flip-flop GC back to raise the potential of the right-hand anode thereof and thereby open gate G2 to succeeding DT20 pulses.

The modifying decoding units MDC1 and MDC2 respectively include ten gates and four gates, not shown, which effect decoding of digits and give units outputs numbered 1 to 10 and tens outputs 0 to 3, see Fig. 4, a total of fourteen outputs which pass to a gating matrix GM, Fig. 4, of any suitable form from which issue the MNT pulses MNT1 to MNT40.

In the immediately preceding description the provision of the pulses MP1 and MP2 has been assumed and the manner in which they are produced will now be described with reference to Figs. 8 and 9.

The number by which address modifying counter C3 is to be modified is written on a storage location of the drum other than track 3, 4, 5 or 6, to be available in the first number time that this storage location is addressed. The writing of the number occurs, for the units digits, in DT3 and, for the tens digits, in DT4 and the digits are coded according to the 1, 2, 4, 8 code as described above with reference to Fig. 3. On receipt of the instruction to modify, the number is read from store and is passed through the arithmetic unit AU, Fig. 5, with no change and issues therefrom along lines M1, M2, M4, M8, Fig. 8, to modify control gates MCG1, MCG2, MCG3, MCG4, MCG5, MCG6, all of which are connected to a line OM along which is passed a pulse representative of the instruction to modify. Also applied to gates MCG1 to MCG4 along line MS1 is a pulse which occurs during digit time DT3, this pulse operating, should a pulse M1, M2, M4, M8 be applied to any of gates MCG1 to MCG4 along any line MS2 by the arithmetic unit AU, through the appropriate cathode follower CF8, CF9, CF10, CF11 to trigger the appropriate one or ones of four gate-conditioning flip-flops GCF1, GCF2, GCF3, GCF4 connected through cathode followers CF12, CF13, CF14, CF15, to modify pulse gates MPG1, MPG2, MPG3, MPG4. During digit time DT8 one pulse is applied to gate MPG1 so that if the gate is conditioned by flip-flop GCF1 one modify pulse passes through the gate MPG1, to a cathode follower CF16 of a cathode follower mix, and thence by modify pulse line MP1 to gate G2, and CF4, Fig. 7. If flip-flops GCF2, GCF3 or GCF4 are triggered then during digit times DT9 and DT10 two modify pulses will pass through gate MPG2 and cathode follower CF17 of the mix; during digit times DT11 to DT14 four modify pulses will pass through gate MPG3 and cathode follower CF18 of the mix; and during digit times DT11 to DT18 eight modify pulses will pass through gate MPG4 and cathode follower CF19 of the mix; respectively.

A pulse is applied to gates MCG5 and MCG6 along line MS3 during digit time DT4 and operates, should a pulse M1, M2, be applied to any of these gates, through cathode followers CF20, CF21, to trigger two further gate-conditioning flip-flops GCF5, GCF6, which are connected through cathode followers CF24, CF25, to modify pulse gates MPG5, MPG6, which, if conditioned, respectively pass 1, or 2, modify pulses, during digit periods DT8; DT9 and DT10, through a cathode follower mix CF28, CF29, to modify pulse line MP2.

Fig. 9 illustrates the wave forms during the production of thirty-seven modify pulses in the manner just described, and from this figure it will be seen that during DT3 there are pulses M1, M2 and M4 representative of the units digit 7 and flip-flops GCF1, GCF2 and GCF3 are triggered by the back edges of these pulses. Thus during DT8, there is one MP1 pulse, during DT9 and DT10 there are two further MP1 pulses, and during DT11, DT12, DT13 and DT14 there are four further MP1 pulses, making a total of seven mixed MP1 pulses which are passed to gate G2, CF4, Fig. 7.

During DT4 there are pulses M1, M2 representative of tens digit 3 and flip-flops GCF5, and GCF6 are triggered by the back edges of these pulses. Thus during DT8 there is one MP2 pulse and during DT9 and DT10 there are two further MP2 pulses making a total of three mixed MP2 pulses which are passed to cathode follower CF6, Fig. 7.

As can be seen from Figs. 8 and 9 the gate-conditioning flip-flops are all reset by the back edge of pulse DT20.

In the foregoing description there has been described only the modification of address to track locations and there will now be described a mode of modifying the track address.

The instruction to modify track is received from the programme card sensing device SD and one modify track instruction taking one number time NT is occupied by each modification of address to one number higher, for example, to modify a track address from 3 to 4 takes one NT period and to modify it from 3 to 5 takes two NT periods, the instruction to modify from 3 to 5 being given as two separate instructions.

Each track number is obtained by the combination of three hole positions, coded 1, 2, 4, in the programme card and these holes are decoded in combination with the anodes of a scale-of-four track address modifying counter C4, Fig. 10, which normally is in the zero condition thereof.

The sensing of the programme card, by sensing device SD, for the track to be addressed, results in pulses, as appropriate, being passed to the track decoder TD along lines X, Y, Z, the pulses passing through cathode followers CF32, CF33, CF34, and pulse shaper and phase inverting circuits PS2, PS3, PS4 which give two outputs X0, X1; Y0, Y1; Z0, Z1 for each input X, Y, Z respectively. The arrangement is such that on one line of a pair X0, X1; Y0, Y1; Z0, Z1, the potential goes up if a hole is sensed by SD and the other line of the pair is up in potential if no hole is sensed by SD. In Fig. 10 it is assumed that if holes are sensed by SD, lines X1, Y1, Z1, as appropriate, rise in potential and that lines X0, Y0, and Z0 are normally up in potential and fall if an input is received along lines X, Y, Z. The lines X, Y, Z, are coded respectively as 1, 2, 4.

The pulse shaping and phase inverting circuits PS2, PS3, PS4 may be of any suitable form which will provide two such outputs from each circuit, for example each circuit may consist of a Schmitt trigger circuit as is well understood in the art.

The scale-of-four track address modifying counter C4 comprises two flip-flops, similar to those of counter C3, giving outputs V0, V1 and W0, W1 respectively, the arrangement being that when the counter is in the zero condition thereof lines V0 and W0 are up in potential. If now the programme calls for the track address to be modified a modify track pulse MT is applied to modify track gate MTG so that during digit time DT3 a pulse passes the gate to trigger counter C4.

The anode potentials of the flip-flops of counter C4 are cathode followed by cathode followers CF35, CF36, CF37, CF38.

The track decoding circuits comprise positive coincidence gates TDG1, TDG2, TDG3, TDG4, TDG5, TDG6, TDG7, TDG8, TDG9 and TDG10 the outputs from which pass respectively to cathode followers CF39, CF40, CF41, CF42, CF43, CF44, CF45, CF46, CF47 and CF48 and the output from CF39 controls track address TA3, outputs from CF40 and CF43 are mixed to control track address TA4, outputs from CF41, CF44 and CF46 are mixed to control track address TA45, and outputs CF42, CF45, CF47 and CF48 are mixed to control track address TA6.

From Fig. 10 it will be understood that the track addressed will be modified only when the sensed address is decoded with a number from counter C4 and the following table sets out the addresses obtainable with the arrangement described with reference to Fig. 10.

| Address Sensed (SD) | State of Counter C4 | Input lines up in Potential | | | | | Track Control Gate Opened | Track addressed |
|---|---|---|---|---|---|---|---|---|
| | | Coded | | | | | | |
| | | 1 | 2 | 4 | 1 | 2 | | |
| 3 | 0 | X1 | Y1 | Z0 | V0 | W0 | TDG1 | TA3 |
| 4 | 0 | X0 | Y0 | Z1 | V0 | W0 | TDG2 | TA4 |
| 5 | 0 | X1 | Y0 | Z1 | V0 | W0 | TDG3 | TA5 |
| 6 | 0 | X0 | Y1 | Z1 | V0 | W0 | TDG4 | TA6 |
| 3 | 1 | X1 | Y1 | Z0 | V1 | W0 | TDG5 | TA4 |
| 4 | 1 | X0 | Y0 | Z1 | V1 | W0 | TDG6 | TA5 |
| 5 | 1 | X1 | Y0 | Z1 | V1 | W0 | TDG7 | TA6 |
| 3 | 2 | X1 | Y1 | Z0 | V0 | W1 | TDG8 | TA5 |
| 4 | 2 | X0 | Y0 | Z1 | V0 | W1 | TDG9 | TA6 |
| 3 | 3 | X1 | Y1 | Z0 | V1 | W1 | TDG10 | TA6 |

The counter C4 is reset at the beginning of each calculation by the master reset pulse MR being applied to the counter through an amplifier Amp and it can also be reset by a pulse DT3 passed through a demodify gate DG during digit time DT3 when a demodify track signal DTC is also applied to the gate.

I claim:

1. A digital computing machine comprising a drum for rotation at a constant angular velocity and having circumferentially extending magnetisable tracks spaced apart axially thereof and track locations of predetermined length extending along the tracks, data-recounting means actuated by electrical pulses and cooperating with the tracks on said drum selectively to enter data into said track locations or selectively to read data from the track locations, control gates one connected to the data-recounting means for each track location, and each arranged to control the data-recounting means appropriate thereto, control gate addressing means connected to the control gates and operable to condition one gate at a time, and including selector means operable to apply discrete pulses to the control gates to indicate the track location to be addressed and a counter from which discrete electrical pulses pass to the control gates so that when a pulse is applied to a control gate conditioned by the selector means a predetermined track location is made accessible during the appropriate time interval, and address-modifying means connected to the counter and operable by an instruction device which controls the transmission thereto of signals representative of a predetermined number to modify the count of the counter by that number so that when the control gate addressing means indicates a predetermined track location, a track location other than said predetermined track location is made accessible.

2. A machine according to claim 1, wherein the address-modifying means comprises selectively operable pulse means co-operating with said counter to modify the count thereof.

3. A machine according to claim 2, including a digit times counter adapted to emit a succession of groups of digit times pulses, each group consisting of a like number of digit times pulses, said digit times counter being connected with said first mentioned counter in a manner such that the last digit times pulse of each group effects triggering of said first mentioned counter as a track location ceases to be accessible.

4. A machine according to claim 3, wherein the digit times counter is adapted to apply digit times pulses to said control gates and is triggered by pulses initiated by said drum.

5. A machine according to claim 4, including a number times counter adapted for actuation by the last digit times pulse of each group thereof, said number times counter being arranged to emit a group of number times pulses and being connected to said first mentioned counter in a manner such that the last pulse of a group of number times pulses effects resetting of the first-mentioned counter to the condition thereof in which the pulses transmitted therefrom to the control gates are in step with the track locations.

6. A machine according to claim 5, wherein, the selectively operable pulse means comprises modify pulse gates controlled by pulses applied thereto during predetermined digit times appropriated thereto and by pulses representative of a number by which the count of said first-mentioned counter is to be modified, and mixing circuits connecting the modify pulse gates to said first mentioned counter.

7. A machine according to claim 6, including a gate-conditioning flip-flop connected to each modify pulse gate, and a modify control gate connected to each said flip-flop, said modify control gates being connected to a gate-conditioning line common thereto and along which a pulse is passed representative of an instruction to modify, and predetermined ones of the modify control gates being connected to a line common thereto and along which a pulse is passed during a predetermined digit times period.

8. A machine according to claim 7, wherein the gate-conditioning flip-flops are connected in common to be triggered to the restored condition thereof by the back edge of the last pulse of a group of digit times pulses.

9. A machine according to claim 8, including a demodify gate connected to said first-mentioned counter to effect resetting thereof on the application to the demodify gate of a pulse during a predetermined digit times period together with a demodify pulse or the last pulse of a group of number times pulses.

10. A digital computing machine comprising data storage means by which data can be stored in storage locations arranged normally to be rendered successively accessible during successive intervals of time of predetermined duration, electrically operable control gates to control access to said storage locations during said intervals, a digit times counter connected with the control gates and adapted to emit a succession of groups of digit times pulses, each group consisting of a like number of digit times pulses, an address-modifying counter triggered by the last pulse of each group of pulses emitted by the digit times counter and arranged to transmit pulses to the control gates, modify pulse gates controlled by pulses applied thereto during predetermined digit times periods appropriated thereto and by pulses representative of a number by which the count of the address-modifying counter is to be modified, and mixing circuits connecting the modify pulse gates to the address-modifying counter.

11. A machine according to claim 10, including a gate-conditioning flip-flop connected to each modify pulse gate, and a modify control gate connected to each said flip-flop, said modify control gates being connected to a gate-conditioning line common thereto and along which a pulse is passed representative of an instruction to modify, and predetermined ones of the modify control gates being connected to a line common thereto and along which a pulse is passed during a predetermined digit times period.

12. A machine according to claim 11, wherein the gate-conditioning flip-flops are connected in common to be triggered to the restored condition thereof by the back edge of the last pulse of a group of digit times pulses.

13. A machine according to claim 12, including a demodify gate connected to the address-modifying counter to effect resetting of the counter on the application to the demodify gate of a pulse during a predetermined digit times period together with a demodify pulse or a number times pulse.

14. A machine according to claim 13, wherein the number times pulse is the last pulse of a group of number times pulses transmitted from a number times counter arranged to transmit groups each of a like number of pulses and triggered by the last pulse of each group of digit times pulses emitted by the digit times counter.

15. A digital computing machine comprising a drum for rotation at a constant angular velocity and having circumferentially extending magnetisable tracks spaced apart axially thereof and track locations of predetermined length extending along the tracks, data-recounting means actuated by electrical pulses and co-operating with the tracks on said drum selectively to enter data into said track locations or selectively to read data from the track locations, control gates connected with the data-recounting means, a digit times counter connected with the control gates and adapted to emit a succession of groups of digit times pulses each group consisting of a like number of digit times pulses, control gate addressing means operable to control access to the tracks and to the track locations according to a location to be addressed, and address-modifying means to modify the operation of the control gate addressing means so that when a predetermined track and track location is to be addressed, a track and track location other than said predetermined track and track location is made accessible.

16. A machine according to claim 15, wherein the control gate addressing means includes track decoder gates connected to the control gates to apply pulses thereto indicative of the track to be addressed, and the address modifying means includes a track modifying counter arranged to apply track modifying pulses to the track decoder gates to be gated with programmed track indicating pulses thereby to permit the application to the control gates of a track indicating pulse other than that programmed to the track decoder gates.

17. A machine according to claim 16, wherein the track modifying counter is normally inactive and is triggered to the active condition thereof under control of a modify track gate to which is applied a modify track pulse and a timing pulse which is applied concurrently with the emission of a predetermined one of a group of digit times pulses issuing from said digit times counter.

18. A machine according to claim 17, wherein the track modifying counter is resettable to the normally inactive condition thereof under control of a demodify track gate to which is applied a demodify track pulse and said timing pulse.

19. A machine according to claim 18, wherein the control gate addressing means includes an address modifying counter triggered by the last pulse of each group of pulses emitted by said digit times counter thereby to apply pulses to the control gates according to a predetermined serial order, and the address modifying means includes modify pulse gates controlled by pulses applied thereto during predetermined digit times periods appropriated thereto and by pulses representative of a number by which the count of the address-modifying counter is to be modified, and mixing circuits connecting the modify pulse gates to the address modifying counter.

20. A machine according to claim 19, including a gate-conditioning flip-flop connected to each modify pulse gate, and a modify control gate connected to each said flip-flop, said modify control gates being connected to a gate-conditioning line common thereto and along which a pulse is passed representative of an instruction to modify, and predetermined ones of the modify control gates being connected to a line common thereto and along which a pulse is passed during a predetermined digit times period.

21. A machine according to claim 20, wherein the gate-conditioning flip-flops are connected in common to be triggered to the restored condition thereof by the back edge of the last pulse of a group of digit times pulses.

22. A machine according to claim 21, including a demodify gate connected to the address modifying counter to effect resetting of the counter on the application to the demodify gate of a pulse during a predetermined digit times period together with a demodify pulse or a number times pulse.

23. A machine according to claim 22, wherein the number times pulse is the last pulse of a group of number times pulses transmitted from a number times counter arranged to transmit groups each of a like number of pulses and triggered by the last pulse of each group of digit times pulses emitted by the digit times counter.

24. A digital computing machine comprising data storage means in which data can be stored in a series of storage locations arranged to be rendered successively accessible during successive intervals of time, electrically operable control gates one for each storage location and each arranged to control access to the storage location appropriate thereto, control gate addressing means, connected to the control gates and operable to condition one gate at a time according to the storage location to be addressed, a counter operable to transmit pulses sequentially to the control gates so that when a pulse is applied to a control gate conditioned by the control gate addressing means a predetermined storage location is made accessible during the appropriate time interval, and address-modifying means connected to the counter and operable by an instruction device which controls the transmission thereto of signals representative of a predetermined number to modify the count of the counter by that number so that when the control gate addressing means indicates a predetermined storage location, a storage location other than said predetermined storage location is made accessible.

25. A machine according to claim 24, wherein the address-modifying means comprises a selectively operable pulse means co-operating with said counter to modify the count thereof.

26. A machine according to claim 25, including selectively operable modify-pulse means co-operating with said counter and operable to apply thereto at least one pulse to restore the counter to an initial state thereof subsequent to the operation of the address-modifying means.

27. A digital computing machine comprising data storage means in which data can be stored in storage locations arranged to be rendered successively accessible during successive intervals of time, data-recounting means actuated by electrical pulses and adapted selectively to enter data into said storage locations or selectively to read data from the storage locations, control gates one connected to the data recounting means for each storage location and each arrnged to control the data recounting means appropriate thereto, control gate addressing means connected to the control gates and operable to condition one gate at a time according to the storage location to be addressed, a counter operable to transmit discreet pulses sequentially to the control gates so that when a pulse is applied to a control gate conditioned by the control gate addressing means a predetermined storage location is made accessible during the appropriate time interval, and address-modifying means connected to the counter and operable by an instruction device which controls the transmission thereto of signals representative of a predetermined number to modify the count of the counter by that number so that when the control gate addressing means conditions the control gate of a predetermined storage location, a storage location other than said predetermined storage location is made accessible by said control gate.

References Cited in the file of this patent

UNITED STATES PATENTS 2,680,241 Gridley ---------------- June 1, 1954